United States Patent
Maruyama et al.

(10) Patent No.: US 8,030,417 B2
(45) Date of Patent: Oct. 4, 2011

(54) PROCESS FOR PRODUCING POLYESTER-POLYCARBONATE TYPE THERMOPLASTIC POLYESTER ELASTOMER AND POLYESTER-POLYCARBONATE TYPE THERMOPLASTIC POLYESTER ELASTOMER

(75) Inventors: Gaku Maruyama, Tsuruga (JP); Kenta Susuki, Tsuruga (JP); Katsuaki Kuze, Ohtsu (JP); Shigeo Ukyo, Ohtsu (JP); Shoji Koketsu, Iwakuni (JP)

(73) Assignee: Toyo Boseki Kabushiki Kaisha, Osaka-shi, Osaka (JP)

( * ) Notice: Subject to any disclaimer, the term of this patent is extended or adjusted under 35 U.S.C. 154(b) by 19 days.

(21) Appl. No.: 12/523,265

(22) PCT Filed: Jan. 23, 2008

(86) PCT No.: PCT/JP2008/050855
§ 371 (c)(1),
(2), (4) Date: Jul. 15, 2009

(87) PCT Pub. No.: WO2008/093574
PCT Pub. Date: Aug. 7, 2008

(65) Prior Publication Data
US 2010/0041858 A1 Feb. 18, 2010

(30) Foreign Application Priority Data
Jan. 29, 2007 (JP) .................. 2007-018108

(51) Int. Cl.
*C08L 69/00* (2006.01)
(52) U.S. Cl. ........ 525/439; 525/437; 525/461; 525/466; 528/306; 528/308; 528/308.7; 528/308.8; 528/370
(58) Field of Classification Search .................. 525/437, 525/439, 461, 466; 528/306, 308, 308.7, 528/308.8, 370
See application file for complete search history.

(56) References Cited

U.S. PATENT DOCUMENTS

| | | | |
|---|---|---|---|
| 5,703,196 A | 12/1997 | Funakoshi et al. | |
| 5,914,386 A | 6/1999 | Berendse et al. | |
| 2003/0176622 A1* | 9/2003 | Konishi et al. | 528/196 |
| 2009/0203871 A1* | 8/2009 | Maruyama et al. | 528/303 |

FOREIGN PATENT DOCUMENTS

| | | |
|---|---|---|
| EP | 0893463 A1 | 1/1999 |
| EP | 1314749 A2 | 5/2003 |
| EP | 1964871 A1 | 9/2008 |
| JP | 7-39480 A | 12/1987 |
| JP | 04-222822 A | 8/1992 |
| JP | 05-295094 A | 11/1993 |
| JP | 06-306262 A | 11/1994 |
| JP | 7-39480 B2 | 5/1995 |
| JP | 10-017657 A | 1/1998 |
| JP | 10-182782 A | 7/1998 |
| JP | 10-231415 A | 9/1998 |
| JP | 2001-206939 * | 7/2001 |
| JP | 2001-206939 | 7/2001 |
| JP | 2001-240663 A | 9/2001 |
| JP | 2003-192778 A | 7/2003 |
| WO | 2007/072748 A1 | 6/2007 |
| WO | WO 2007/072748 * | 6/2007 |

OTHER PUBLICATIONS

International Search Report of PCT/JP2008/050855, Mailing Date of May 1, 2008.

* cited by examiner

*Primary Examiner* — David W Wu
*Assistant Examiner* — Robert Jones, Jr.
(74) *Attorney, Agent, or Firm* — Westerman, Hattori, Daniels & Adrian, LLP

(57) ABSTRACT

The present invention is a process for producing a polyester-polycarbonate type thermoplastic polyester elastomer in which a hard segment consisting of a polyester constructed of aromatic dicarboxylic acid, and an aliphatic or alicyclic diol, and a soft segment consisting mainly of aliphatic polycarbonate are connected, comprising at least a step of increasing the molecular weight of an aliphatic polycarbonate diol by a reaction of an aliphatic polycarbonate diol and a chain extender, and a step of reacting aliphatic polycarbonate and a polyester constructed of aromatic dicarboxylic acid and an aliphatic or alicyclic diol in the molten state.

8 Claims, No Drawings

PROCESS FOR PRODUCING POLYESTER-POLYCARBONATE TYPE THERMOPLASTIC POLYESTER ELASTOMER AND POLYESTER-POLYCARBONATE TYPE THERMOPLASTIC POLYESTER ELASTOMER

TECHNICAL FIELD

The present invention relates to a process for producing a polyester-polycarbonate type thermoplastic polyester elastomer, and a polyester-polycarbonate type thermoplastic polyester elastomer. More particularly, the present invention relates to a process for producing a polyester-polycarbonate type thermoplastic polyester elastomer excellent in heat resistance, light resistance, heat aging resistance, water resistance, and low temperature property, particularly a polyester-polycarbonate type thermoplastic polyester elastomer which can be used in various molding materials including fibers, films, and sheets, further particularly, a polyester-polycarbonate type thermoplastic polyester elastomer which is suitable for elastic yarns and molding materials such as boots, gears, tubes and packings, and is useful in utility requiring heat aging resistance, water resistance, low temperature property and heat resistance such as automobiles, and household appliances, for example, joint boots, and electric wire covering materials, and a polyester-polycarbonate type thermoplastic polyester elastomer obtained by the process.

BACKGROUND ART

As the thermoplastic polyester elastomer, thermoplastic polyester elastomers in which a soft segment is a crystallizable polyester including polybutylene terephthalate (PBT), and polybutylene naphthalate (PBN), and a hard segment is polyoxyalkylenes such as polytetramethylene glycol (PTNG) and/or a polyester such as polycaprolactone (PCL), and polybutylene adipate (PBA), have previously been known, and put into practice (e.g. Patent Publications 1, 2).
Patent Publication 1: JP-A No. 10-17657
Patent Publication 2: JP-A No. 2003-192778

However, it is known that a polyester polyether-type elastomer using polyoxyalkylenes in the soft segment is excellent in water resistance and low temperature property, but is inferior in heat aging resistance, and a polyester-polyester type elastomer using a polyester in the soft segment is excellent in heat aging resistance, but is inferior in water resistance and low temperature property.

For the purpose of solving the aforementioned defects, polyester-polycarbonate type elastomers using polycarbonate in the soft segment have been proposed (see e.g. Patent Publications 3 to 8.
Patent Publication 3: JP-B No. 7-39480
Patent Publication 4: JP-A No. 5-295094
Patent Publication 5: JP-A No. 10-231415
Patent Publication 6: JP-A No. 10-182782
Patent Publication 7: JP-A No. 2001-206939
Patent Publication 8: JP-A No. 2001-240663

The aforementioned problems are solved, but the polyester polycarbonate-type thermoplastic polyester elastomers disclosed in these Patent Publications have a problem that the resulting polyester-polycarbonate type thermoplastic polyester elastomer is inferior in retainability of blocking property when the polyester-polycarbonate type elastomer is retained in the molten state (hereinafter, also simply referred to as blocking property retainability in some cases), for the reason of the small molecular weight of polycarbonate diol used as a raw material.

For example, since low blocking property leads to a problem that the melting point of the polyester-polycarbonate type thermoplastic polyester elastomer is lowered, for example, in the case of the joint boots and electric wire covering materials, deficiency of heat resistance becomes a problem in some cases in utility of use under the high temperature environment such as a periphery of an engine of automobiles, in some cases. Patent Publications 4, 7 and 8 disclose rise in the melting point is realized by introducing a naphthalate skeleton as a polyester component, but since introduction of the naphthalate skeleton is expensive, rise in the melting point realized by a polyester component having an inexpensive terephthalate skeleton is desired. In addition, regarding a polyester-polycarbonate type thermoplastic polyester elastomer consisting of a polyester component having a naphthalate skeleton, rise in the melting point corresponding to increase in the cost is demanded.

In addition, in recent years, from a view point of the environmental load and the cost reduction, reutilization of off-specification products, or recycle of commercial goods is demanded. In order to satisfy the demand, high blocking property retainability is required. From the background, development of a polyester-polycarbonate type thermoplastic polyester elastomer having high blocking property and excellent retainability of the blocking property is strongly solicited.

On the other hand, Patent Publications 7 and 8 disclose a process of reacting a polyester component forming a hard segment and a polycarbonate diol component forming a soft segment in the molten state to form a block polymer, and increasing the molecular weight with a chain extender. The process is an effective method as a method of increasing the molecular weight of a block polymer, but since the blocking property and retainability of the blocking property undergo greatly control mainly by a reaction during formation of the block polymer, it is difficult to improve the blocking property and the blocking property retainability by a method of increasing the molecular weight with a chain extender after formation of the block polymer. Therefore, in the prior art, a polyester-polycarbonate type thermoplastic polyester elastomer having preferable property has not been obtained. For this reason, establishment of a process for economically producing a polyester-polycarbonate type thermoplastic polyester elastomer having preferable property is strongly solicited.

DISCLOSURE OF THE INVENTION

Problems to be Solved by the Invention

In view of the previous problems possessed by the polyester-polycarbonate type thermoplastic polyester elastomer, an object of the present invention is to provide an economic process for producing a polyester-polycarbonate type thermoplastic polyester elastomer having excellent heat resistance, heat aging resistance, water resistance, light resistance and low temperature property, and excellent in blocking property retainability, and a polyester-polycarbonate type thermoplastic polyester elastomer obtained by it.

Means to Solve the Problems

The present invention for attaining the object is as follows:
[1] A process for producing a polyester-polycarbonate type thermoplastic polyester elastomer in which a hard segment consisting of a polyester constructed of aromatic dicarboxylic acid and an aliphatic or alicyclic diol, and a soft segment consisting mainly of aliphatic polycarbonate are connected, comprising at least the following steps:

step 1: a step of obtaining the aliphatic polycarbonate having the increased molecular weight by a reaction of an aliphatic polycarbonate diol and a chain extender, step 2: a step of reacting the aliphatic polycarbonate and the polyester in the molten state.

Hereinafter, different terms are used in principle such that polycarbonate in which the molecular weight has not been increased before the reaction with the chain extender in the step 1 is referred to as aliphatic polycarbonate diol, and polycarbonate in which the molecular weight has been increased after the reaction is referred as aliphatic polycarbonate.

[2] The process for producing a polyester-polycarbonate type thermoplastic polyester elastomer according to [1], wherein the step 1 and the step 2 are performed in different reaction tanks.

[3] The process for producing a polyester-polycarbonate type thermoplastic polyester elastomer according to [1] or [2], wherein the number average molecular weight of the aliphatic polycarbonate is 5000 to 80000.

[4] A polyester-polycarbonate type thermoplastic polyester elastomer obtained by the process as defined in any one of [1] to [3], characterized in that when a cycle of raising the temperature of the polyester-polycarbonate type thermoplastic polyester elastomer from room temperature to 300° C. at the temperature raising rate of 20° C./min using a differential scanning calorimeter, retaining the temperature at 300° C. for 3 minutes, and lowering the temperature to room temperature at the temperature lowering rate of 100° C./min is repeated three times, the melting point difference (Tm1−Tm3) between the melting point (Tm1) obtained by first measurement and the melting point (Tm3) obtained by third measurement is 0 to 50° C.

[5] The polyester-polycarbonate type thermoplastic polyester elastomer according to [4], wherein the hard segment consists of a polybutylene terephthalate unit, and the melting point of the resulting polyester-polycarbonate type thermoplastic polyester elastomer is 200 to 225° C.

[6] The polyester-polycarbonate type thermoplastic polyester elastomer according to [4], wherein the hard segment consists of a polybutylene naphthalate unit, and the melting point of the resulting polyester-polycarbonate type thermoplastic polyester elastomer is 215 to 240° C.

[7] The polyester-polycarbonate type thermoplastic polyester elastomer according to any one of [4] to [6], wherein letting the average chain length of the hard segment calculated using nuclear magnetic resonance (NMR method) to be x, and letting the average chain length of the soft segment to be y, the average chain length (x) of the hard segment is 5 to 20, and blocking property (B) calculated by the following (1) equation is 0.11 to 0.45.

$$B = 1/x + 1/y \quad (1)$$

EFFECT OF THE INVENTION

The process for producing a polyester-polycarbonate type thermoplastic polyester elastomer of the present invention has an advantage that, by introducing a step of increasing the molecular weight of an aliphatic polycarbonate diol by a reaction of an aliphatic polycarbonate diol and a chain extender (step 1: hereinafter, referred to as raw material molecular weight up step in some cases) prior to the previously known step of reacting an aliphatic polycarbonate diol and an aromatic polyester (hereinafter, a polyester constructed of aromatic dicarboxylic acid and an aliphatic or alicyclic diol is referred to as aromatic polyester in some cases) in the molten state (step 2: hereinafter, referred to as blocking reaction step in some cases), a high quality polyester-polycarbonate type thermoplastic polyester elastomer having the following properties can be produced economically and stably by a simple method of increasing the molecular weight of aliphatic polycarbonate supplied to a blocking reaction. In addition, the process is preferably such that the step 1 and the step 2 are performed in different reaction tanks, and has an advantage that the elastomer can be produced utilizing a general-use apparatus for producing a polyester using such the form that a transesterification or esterification reaction and a polycondensation reaction are performed in separate reaction tanks.

In addition, the polyester-polycarbonate type thermoplastic polyester elastomer of the present invention obtained by the process is improved in blocking property and blocking property retainability while maintaining characteristics of the polyester-polycarbonate type thermoplastic elastomer being good in heat resistance, and excellent in heat aging property, water resistance and low temperature property. Due to high blocking property, reduction in heat resistance resulting from reduction in the melting point is suppressed, and a mechanical nature such as a hardness, a tensile strength, and an elastic modulus is improved. In addition, by improvement in blocking property retainability, since variation of blocking property at molding processing is suppressed, uniformity of quality of molded articles can be enhanced. In addition, due to the characteristics, since recycle property is enhanced, this can lead to reduction in environmental load and cost. Therefore, like this, since the polyester-polycarbonate type thermoplastic polyester elastomer of the present invention has the excellent properties and advantages, it can be used in various molding materials including fibers, films, and sheets. In addition, the elastomer is also suitable in elastic yarns, and molding materials such as boots, gears, tubes, and packings and, for example, is useful in utility requiring heat aging resistance, water resistance, and low temperature property such as automobiles, and household parts, specifically, utility such as joint boots, and electric wire covering materials. Particularly, the elastomer can be suitably used as materials for parts requiring high heat resistance, such as joint boots used in a periphery of an engine of automobiles, and electric wire covering materials.

BEST MODE FOR CARRYING OUT THE INVENTION

The polyester-polycarbonate type thermoplastic polyester elastomer of the present invention will be explained in detail below.

In the polyester-polycarbonate type thermoplastic polyester elastomer of the present invention, as aromatic dicarboxylic acid constituting a polyester of the hard segment, normal aromatic dicarboxylic acid is widely used without any limitation. It is desirable that main aromatic dicarboxylic acid is terephthalic acid or naphthalene dicarboxylic acid. Examples of other acid component include aromatic dicarboxylic acids such as diphenyldicarboxylic acid, isophthalic acid, and sodium 5-sulfoisophthalate, alicyclic dicarboxylic acids such as cyclohexanedicarboxylic acid, and anhydrous tetrahydrophthalic acid, and aliphatic dicarboxylic acids such as succinic acid, glutaric acid, adipic acid, azelaic acid, sebacic acid, dodecanedionic acid, dimer acid, and hydrogenated dimer acid. These are used in such the range that the melting point of resins is not greatly lowered, and the amount thereof is less than 30 mol %, preferably less than 20 mol % of a total acid component.

In addition, in the polyester-polycarbonate type thermoplastic polyester elastomer of the present invention, as aliphatic or alicyclic diol constituting a polyester of the hard segment, general aliphatic or alicyclic diols are widely used without any limitation. It is desirable that the diol is mainly alkylene glycols of the carbon number of 2 to 8. Specifically, examples include ethylene glycol, 1,3-propylene glycol, 1,4-butanediol, 1,6-hexanediol, and 1,4-cyclohexanedimethanol. 1,4-butanediol and 1,4-cyclohexanedimethanol are most preferable.

As a component constituting a polyester of the hard segment, a component consisting of a butylene terephthalate unit or a butylene naphthalate unit is preferable from a view point of physical properties, molding property and the cost. In the case of the naphthalate unit, a 2,6 body is preferable.

An aromatic polyester suitable as a polyester constituting the hard segment in the polyester-polycarbonate type thermoplastic polyester elastomer of the present invention can be easily obtained according to the conventional process of producing a polyester. It is desirable that such the polyester has generally the number average molecular weight of 10000 to 40000.

The aliphatic polycarbonate chain constituting the soft segment in the polyester-polycarbonate type thermoplastic polyester elastomer of the present invention preferably consists mainly of an aliphatic diol residue of the carbon number of 2 to 12. Examples of the aliphatic diol include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, and 2-methyl-1,8-octanediol. Particularly, from a point of flexibility and low temperature property of the resulting polyester-polycarbonate type thermoplastic polyester elastomer, an aliphatic diol of the carbon number of 5 to 12 is preferable. These components may be used alone, or two or more kinds may be used together, if necessary, based on instances explained below.

As the aliphatic polycarbonate diol having good low temperature property, constituting the soft segment of the polyester-polycarbonate type thermoplastic polyester elastomer in the present invention, a diol having the low melting point (e.g. 70° C. or lower), and the low glass transition temperature is preferable. Generally, since an aliphatic polycarbonate diol consisting of 1,6-hexanediol used in forming the soft segment of the polyester-polycarbonate type thermoplastic polyester elastomer has the low glass transition temperature of around −60° C., and the melting point of around 50° C., low temperature property becomes good. Besides, since an aliphatic polycarbonate diol obtained by copolymerizing the aliphatic polycarbonate diol with, for example, the suitable amount of 3-methyl-1,5-pentanediol has the slightly higher glass transition point than that of the original aliphatic polycarbonate diol, but has the lowered melting point or becomes amorphous, this corresponds to the aliphatic polycarbonate diol having good low temperature property. In addition, for example, since the aliphatic polycarbonate diol consisting of 1,9-nonane diol and 2-methyl-1,8-octanediol has the sufficiently low melting point of around 30° C., and the sufficiently low glass transition temperature of around −70° C., this corresponds to the aliphatic polycarbonate diol having good low temperature property.

The aliphatic polycarbonate diol is not necessarily composed of only a polycarbonate component, and may be copolymerized with the small amount of other glycol, dicarboxylic acid, an ester compound or an ether compound. Examples of the copolymerization component include glycols such as a dimer diol, a hydrogenated dimer diol and a modified diol thereof, dicarboxylic acids such as dimer acid, and hydrogenated dimer acid, poly- or oligoesters consisting of aliphatic, aromatic or alicyclic dicarboxylic acids and glycols, polyesters or oligoesters consisting of ε-caprolactone, and alkylene glycols or oligoalkylene glycols such as polytetramethylene glycol, and polyoxyethylene glycol.

The copolymerization component can be used at such the extent that the effect of the aliphatic polycarbonate segment does not substantially disappear. Specifically, the amount of the copolymerization component is 40 parts by weight or less, preferably 30 parts by mass or less, more preferably 20 parts by mass or less based on 100 parts by mass of the aliphatic polycarbonate segment. When the copolymerization amount is too great, the resulting polyester-polycarbonate type thermoplastic polyester elastomer becomes inferior in heat aging resistance, and water resistance.

As the soft segment, a copolymerization component such as polyalkylene glycol such as polyethylene glycol, and polyoxytetramethylene glycol or polyester such as polycaprolactone, and polybutylene adipate may be introduced into the polyester-polycarbonate type thermoplastic polyester elastomer of the present invention, as far as the effect of the invention is not lost. The content of the copolymerization component is usually 40 parts by mass or less, preferably 30 parts by mass or less, more preferably 20 parts by mass or less based on 100 parts by mass of the soft segment.

In the polyester-polycarbonate type thermoplastic polyester elastomer of the present invention, the mass part ratio of the polyester constituting the hard segment, and the aliphatic polycarbonate and the copolymer component constituting the soft segment is generally in the range of hard segment:soft segment=30:70 to 95:5, preferably 40:60 to 90:10, more preferably 45:55 to 87:13, most preferably 50:50 to 85:15.

In the present invention, it is necessary that the process for producing the polyester-polycarbonate type thermoplastic polyester elastomer having the aforementioned composition comprises at least the following steps.

Step 1: a step of obtaining aliphatic polycarbonate having the increased molecular weight by a reaction of an aliphatic polycarbonate diol and a chain extender, Step 2: a step of reacting the aliphatic polycarbonate and a polyester in the molten state.

In the prior art disclosed in Patent Publications 4, 7 and 8, the elastomer was produced by only the step 2 of reacting the aliphatic polycarbonate diol and the aromatic polyester in the molten state, that is, a step similar to a blocking reaction step, but in the present invention, it is the great characteristic that, prior to the blocking reaction step, a raw material molecular weight up step of increasing the molecular weight of the aliphatic polycarbonate diol by a reaction of the aliphatic polycarbonate diol and the chain extender is introduced, and the blocking reaction is performed using the aliphatic polycarbonate having the increased molecular weight obtained by the step. By the strategy, it has become possible to economically and stably produce a high quality polyester-polycarbonate type thermoplastic polyester elastomer described later, having improved properties possessed by the polyester-polycarbonate type thermoplastic polyester elastomer obtained by the prior art.

In the present invention, the molecular weight of the aliphatic polycarbonate having the increased molecular weight is preferably 5000 to 80000 in terms of the number average molecular weight. As the molecular weight is greater, blocking property and blocking property retainability are improved. On the other hand, conversely, when the molecular weight is too high, compatibility of the hard segment and the soft segment is reduced, being not preferable. Therefore, the molecular weight of the polycarbonate diol is preferably 5000 to 80000, more preferably 7000 to 70000, further preferably 8000 to 60000 in terms of the number average molecular weight. When the molecular weight of the polycarbonate diol is less than 5000, blocking property and blocking property retainability are deteriorated, being not preferable. Conversely, when the molecular weight of the polycarbonate diol exceeds 80000, compatibility of the hard segment and the soft segment is reduced, mechanical property such as a strength and an elongation of the resulting polyester-polycarbonate type thermoplastic polyester elastomer is inferior, and fluctuation of the properties becomes great, being not preferable.

For example, the molecular weight of a commercially available aliphatic polycarbonate diol is 3000 or less. Therefore, it is a preferable embodiment that the aliphatic polycarbonate diol in the preferable range is obtained using the commercially available aliphatic polycarbonate diol of the low molecular weight.

The chain extender is not limited as far as it is a polyfunctional active compound containing 2 or more functional groups having reactivity with a terminal hydroxyl group of the aliphatic polycarbonate diol in one molecule. The number of functional groups is not limited as far as it is 2 or more, and a difunctional group is preferable. Examples include diphenyl carbonate, diisocyanate, and dicarboxylic anhydride. If the small amount, a polyfunctional, i.e., tri- or more-functional compound may be used. In place of diphenyl carbonate, a carbonate compound such as dimethyl carbonate, diethyl carbonate, dipropyl carbonate, diisopropyl carbonate, dibutyl carbonate, and dimethyl carbonate may be used. Alternatively, it may be cyclic carbonate such as ethylene carbonate, or a dithio carbonate compound. Alternatively, in place of a phenoxy group of a diphenyl carbonate, a carbonyl compound having a nitrogen-containing compound residue such as imidazole and lactam may be used.

As the low-molecular aliphatic polycarbonate diol before increase in the molecular weight by the aforementioned method, it is preferable to utilize a commercially available diol, without any limitation. For example, when a special copolymer is required as the aliphatic polycarbonate diol, a diol which was especially prepared may be used.

In the aforementioned method, adjustment of the molecular weight of the resulting aliphatic polycarbonate can be performed by changing the molecular weight of the aliphatic polycarbonate diol which is a starting raw material, or the charging ratio of the aliphatic polycarbonate diol and the chain extender. Alternatively, the molecular weight may be also adjusted by the reaction time. As the molecular weight of a starting raw material is higher, or the charging ratio of the chain extender is smaller, the molecular weight of the resulting aliphatic polycarbonate becomes higher. The molecular weight may be conveniently set depending on the goal molecular weight.

As a reaction method conducted by the aforementioned method, reaction condition such as the reaction temperature, the reaction time, stirring condition and the like is not limited, as far as the aliphatic polycarbonate diol having the lower molecular weight than the final molecular weight and the chain extender are mixed and reacted in a reactor. For example, when diphenyl carbonate is used as the chain extender, the reaction is preferably performed by the following method.

For example, a polycarbonate diol (molecular weight 2000) consisting of commercially available 1,6-hexanediol and diphenyl carbonate are charged under the normal pressure to under pressure, the mixture is heated, and the reaction can proceed in the molten state while removing phenol produced by the reaction. A method of removing phenol is not limited. Examples include a method of reducing the pressure with a vacuum pump or an ejector, and a method of flowing an inert gas.

The charging mole ratio of the polycarbonate diol and the diphenyl carbonate in the reaction [diphenyl carbonate/polycarbonate diol (molecular weight 2000) consisting of 1,6-hexanediol] is preferably in the range of 0.5 to 1.5, more preferably in the range of 0.6 to 1.4. When the ratio is outside this range, it is difficult to maintain the desired molecular weight. And, at charging of the raw materials or at the reaction, it is preferable that the interior of a reaction can is replaced with an inert gas to remove oxygen. When the amount of remaining oxygen is greater, the reaction product may be colored, being not preferable. The temperature in the reaction can at charging of the raw materials is preferably 100 to 130° C. After charging of raw materials, the temperature is raised to 150 to 250° C. while stirring, to proceed the reaction. The reaction temperature is preferably 170 to 240° C., further preferably 180 to 230° C. Then the temperature is lower than 150° C., the reaction rate is very slow, the molecular weight does not reach a desired one, and the reaction time becomes very long, resulting in the high production cost. Conversely, when the temperature is higher than 250° C., a degradation reaction due to thermal degradation is increased, and coloration of the reaction product is seen, being not preferable. When the temperature reaches the predetermined reaction temperature, the pressure in the reaction can is gradually reduced from the normal pressure to 530 Pa or lower over 30 to 120 minutes, thereafter, phenol eliminated by the reaction is preferably removed. The pressure is more preferably 400 Pa or lower, further preferably, 270 Pa or lower. When the pressure is higher than 530 Pa, the rate of removing phenol eliminated by progression of the reaction becomes very slow, the molecular weight does not reach a desired one, and the reaction time becomes very long, resulting in the high production cost. The time required for a reaction after attainment of the predetermined vacuum degree is preferably shorter. The time is preferably 240 minutes or shorter, more preferably 180 minutes or shorter, further preferably 120 minutes or shorter. It is preferable that the molecular weight of polycarbonate diol is controlled using a stirring power of the reaction can as the measure.

In the present invention, the reaction condition of the blocking reaction step of the step 2 is not limited as far as use of aliphatic polycarbonate having the increased molecular weight obtained by the aforementioned method is satisfied, and the reaction is performed at the temperature in the range of the melting point of an aromatic polyester constituting the hard segment to the melting point +30° C. In this reaction, the concentration of an active catalyst is arbitrarily set depending on the temperature at which the reaction is performed. That is, since a transestrification reaction and depolymerization proceed rapidly at the higher reaction temperature, it is desirable that the concentration of the active catalyst in the system is low, and it is desirable that the active catalyst is present at some extent of the concentration at the lower reaction temperature.

As the catalyst, a normal catalyst, for example, one or two or more kinds of titanium compounds such as titanium tetrabutoxide and potassium oxalate titanate, and tin compounds such as dibutyltin oxide, and monohydroxybutyltin oxide may be used. The catalyst may be present in the polyester or the polycarbonate in advance and, in that case, it is not necessary to add the catalyst newly. Further, the catalyst in the polyester or the polycarbonate may be partially or substantially completely inactivated in advance by an arbitrary method. For example, when titanium tetrabutoxide is used as the catalyst, the catalyst is inactivated by adding a phosphorus compound such as phosphorous acid, phosphoric acid, triphenyl phosphate, tristriethylene glycol phosphate, orthophosphoric acid, carbetoxydimethyldiethyl phosphonate, triphenyl phosphite, trimethyl phosphate, and trimethyl phosphite, being not limiting.

The reaction may be performed by arbitrarily determining a combination of the reaction temperature, the catalyst concentration and the reaction time. That is, its suitable value of the reaction condition fluctuates depending on a variety of factors such as the kind and the amount ratio of the hard segment and the soft segment used, a shape of an apparatus used, and stirring situation.

The optimal value of the reaction condition is, for example, the case where when the melting point of the resulting block copolymerized polyester (polyester-polycarbonate type thermoplastic polyester elastomer) and the melting point of a polyester used as the hard segment are compared, the difference thereof is 2° C. to 60° C. When the melting point difference is less than 2° C., both segments have not been mixed or/and reacted, and the resulting polymer exhibits inferior elasticity performance. On the other hand, when the melting point difference exceeds 60° C., since the transesterification reaction proceeds remarkably, blocking property of the resulting polymer is reduced, and crystallizability and elasticity performance are reduced.

For example, using polybutylene terephthalate as a polyester constructed of aromatic dicarboxylic acid and aliphatic or alicyclic diol, the polybutylene terephthalate, and aliphatic polycarbonate consisting of 1,6-hexanediol having the increased molecular weight are charged into the reaction can at once at predetermined amounts, oxygen in the reaction can is removed with an inert gas, and the pressure in the reaction can is reduced. The pressure in the reaction can is preferably 400 Pa or lower, more preferably 270 Pa or lower, further preferably 140 Pa or lower. The mixture is stirred while maintaining the reduced pressure degree, the temperature is gradually raised, and a reaction proceeds at the temperature higher than the melting point of polybutylene terephthalate by 5 to 40° C., while dissolving the reactants. The temperature difference is more preferably a 7 to 35° C. higher temperature, further preferably a 10 to 30° C. higher temperature. When the temperature difference is smaller than 5° C., since polybutylene terephthalate is solidified, and it cannot be uniformly mixed, there is a possibility that quality of the resulting thermoplastic polyester elastomer fluctuates. On the other hand, when the temperature difference is greater than 40° C., since the reaction proceeds too rapidly, the reaction is randomized, and a thermoplastic polyester elastomer poor in heat resistance is made. The reaction time is preferably 360 minutes or shorter, more preferably 360 minutes or shorter, further preferably 240 minutes or shorter. When the reaction time is too long, a production cycle is extended, and this becomes a factor for increase in the production cost. At the timepoint when each raw material becomes uniform, the reaction is completed, stirring is stopped, and a molten polyester-polycarbonate type thermoplastic polyester elastomer is taken out through an outlet at a lower part of the reaction can, cooled to solidify, and cut with a chip cutter such as a strand cutter to obtain chips of a polyester-polycarbonate type thermoplastic polyester.

It is desirable to inactivate the catalyst remaining in the molten mixture obtained by the reaction as completely as possible by an arbitrary method. When the catalyst remains more than necessary, a transesterification reaction further proceeds at compounding or at molding, and it is thought that physical property of the resulting polymer fluctuates.

The present inactivation reaction is performed by, for example, the aforementioned manner, that is, by adding a phosphorus compound such as phosphorous acid, phosphoric acid, triphenyl phosphate, tristriethylene glycol phosphate, orthophosphoric acid, carbetoxydimethyldiethyl phosphonate, triphenyl phosphite, trimethyl phosphate, and trimethyl phosphite, being not limiting.

The polyester-polycarbonate type thermoplastic polyester elastomer of the present invention may contain tri- or-more functional polycarboxylic acid or polyol only at the small amount. For example, trimellitic anhydride, benzophenonetetracarboxylic acid, trimethylolpropane, or glycerin can be used.

In the present invention, in addition to the aforementioned two steps, for example, other steps such as a step of storing or drying aliphatic polycarbonate having the increased molecular weight obtained in the step 1, a step of producing, melting or drying an aromatic polyester to be charged into the step 2, a step of drying, increasing a viscosity of, or compounding and the like the polyester-polycarbonate type thermoplastic polyester elastomer obtained in the step 2, may be combined. A combination of the steps can be arbitrarily set as far as inclusion of the step 1 and the step 2 is satisfied.

In the present invention, when the aforementioned requirement is satisfied, for example, the shape, the volume and the number of reaction apparatuses in which the steps are performed are not limited.

For example, the number of the reaction tank is one, and both of the step 1 and the step 2 may be sequentially conducted in the one reaction tank. However, when both reactions are sequentially conducted in the one reaction tank, since variation of quality of the polyester-polycarbonate type thermoplastic polyester elastomer in each production at repetitive production is increased by influence of a kettle residue remaining in the reaction tank when production is conducted by repetition, it is a preferable embodiment that the step 1 and the step 2 are conducted in separate reaction tanks.

It is necessary that a structure of the reaction tank has at least a stirrer for stirring reactants and the function of heating the reactants. Since both of the step 1 and the step 2 can promote the reaction by the reduced pressure in some cases, it is preferable that the reaction system is connected to a reduced pressure system. As described above, as a production apparatus by a batch method of a general-use polyester, a form that a transesterifiction reaction or an estrification reaction, and a polycondensation reaction are generally conducted in separate reaction tanks is used, and since the structure has the function, it is one of preferable embodiments that the reaction is conducted using an apparatus for producing a general-use polyester.

In the present invention, a combination of the step 1 and the step 2 is not limited in other requirements as far as conduct of the step 2 after the step 1 is satisfied. For example, the step 1 and the step 2 may be continuously performed, or may be performed discontinuously.

For example, the following conduct methods are exemplified, being not limiting.

1. A method of first charging an aliphatic polycarbonate diol and a chain extender using one reaction tank, performing raw material molecular weight up which is a reaction of the step 1, charging an aromatic polyester after completion of the reaction, subsequently continuing heating and stirring, and performing a blocking reaction of the step 2 to obtain a polyester-polycarbonate type thermoplastic polyester elastomer.

2. A method of, in two reaction tanks in which a reaction tank for conducting the step 1 and a reaction tank for performing the step 2 are connected, charging an aliphatic polycarbonate diol and a chain extender into a first reaction tank, performing a reaction of the step 1, transferring the resulting reaction product to a second reaction tank, charging aromatic polyester chips into the second reaction tank, and heating and stirring the mixture to perform a blocking reaction to obtain a polyester-polycarbonate type thermoplastic polyester elastomer.

3. A method of melting an aromatic polyester in a second reaction tank, transferring aliphatic polycarbonate, a molecular weight of which has been increased in the first reaction tank, to a second reaction tank with the molten aromatic polyester charged therein, and performing a blocking reaction, in the method of 2.

4. A method of charging, for example, an aromatic polyester which has been melted with a melt extruder into a second reaction tank, in the method of 2. An order of charging the aliphatic polycarbonate and the molten aromatic polyester into the second reaction tank in this case is not limited. Simultaneous charging, or a sequential method of charging any one of them, and charging the other may be used.

5. A method of providing an apparatus for producing an aromatic polyester, and charging the aromatic polyester in the molten state produced by the apparatus for producing the aromatic polyester, in the method of 3.

6. A method of preparing two reaction tanks, performing a reaction of the step 1 using one reaction tank, taking out the reaction product, taking out aliphatic polycarbonate with the increased molecular weight to convert into a solid, charging the solid aliphatic polycarbonate with the increased molecular weight and an aromatic polyester into the other reaction tank, and performing a blocking reaction of the step 2 to obtain a polyester-polycarbonate type thermoplastic polyester elastomer.

7. A method of preparing three reaction tanks, performing a reaction of the step 1 using one of the reaction tanks, taking out the reaction product, transferring aliphatic polycarbonate with the increased molecular weight in the molten state to a second tank, and storing the polycarbonate under the nitrogen atmosphere, and performing a blocking reaction of the step 2 in a third reaction tank to obtain a polyester-polycarbonate type thermoplastic polyester elastomer.

8. A method of providing a compounding tank in which an aliphatic polycarbonate diol and a chain extender are blended, in addition to the reaction tanks used in the aforementioned methods, charging an aliphatic polycarbonate diol and a chain extender into the compounding tank, compounding a composition for performing a reaction of the step 1, and charging this into a reaction tank in which a reaction of the step 1 is performed in the methods of 1 to 6.

In the polyester-polycarbonate type thermoplastic polyester elastomer of the present invention obtained by the aforementioned methods, it is important that, when a cycle of raising the temperature of the polyester-polycarbonate type thermoplastic polyester elastomer from room temperature to 300° C. at the temperature raising rate of 20° C./min using a differential scanning calorimeter, retaining the elastomer at 300° C. for 3 minutes, and lowering the temperature to room temperature at the temperature lowering rate of 100° C./min is repeated three times, the melting difference (Tm1−Tm3) between the melting point (Tm1) obtained by first measurement and the melting point (Tm3) obtained by third measurement is 0 to 50° C. The melting point difference is more preferably 0 to 40° C., further preferably 0 to 30° C. The melting point difference is a measure of blocking property retainability of the polyester-polycarbonate type thermoplastic polyester elastomer, and as the temperature difference is smaller, blocking property retainability is more excellent. When the melting point difference exceeds 50° C., blocking property retainability is deteriorated, and fluctuation of quality at molding and processing becomes great, leading to deterioration of quality uniformity of molded articles, and deterioration of recycle property.

By satisfying the aforementioned properties, the effect of excellent blocking property possessed by the polyester-polycarbonate type thermoplastic polyester elastomer of the present invention described later can be effectively utilized.

In the present invention, the hard segment consists of a polybutylene terephthalate unit and the melting point of the polyester-polycarbonate type thermoplastic polyester elastomer is preferably 200 to 225° C., more preferably 205 to 225° C.

Further, in the present invention, the hard segment consists of a polybutylene naphthalate unit and the melting point of the polyester-polycarbonate type thermoplastic polyester elastomer is preferably 215 to 240° C., more preferably 220 to 240° C.

When the hard segment is a polybutylene terephthalate unit or a polybutylene naphthalate unit, it is economically advantageous because commercial polyesters such as polybutylene terephthalate or polybutylene naphthalate may be used.

It is not preferable that the melting point of the polyester-polycarbonate type thermoplastic polyester elastomer is below the above lower limit because its blocking property declines and heat resistance and mechanical properties of the polyester-polycarbonate type thermoplastic polyester elastomer are deteriorated. On the other hand, it is not preferable that the melting point is above the above upper limit because compatibility between the hard segment and the soft segment becomes worse and mechanical properties of the polyester-polycarbonate type thermoplastic polyester elastomer are deteriorated.

The polyester-polycarbonate type thermoplastic polyester elastomer of the present invention has a polyester unit as the hard segment and an aliphatic polycarbonate unit as the soft segment. An average of the repeating number of repeating units constituting one of the homopolymer structure units is referred to as an average chain length and, in this text, the value is calculated by using nuclear magnetic resonance (NMR) unless otherwise instructed.

Letting the average chain length of the hard segment to be x and an average chain length of the soft segment to be y when they are calculated by using nuclear magnetic resonance (NMR), it is preferable that the average chain length of the hard segment (x) is 5 to 20 and blocking property (B) calculated by the following equation (1):

$$B = 1/x + 1/y \qquad (1)$$

is 0.11 to 0.45.

In the polyester-polycarbonate type thermoplastic polyester elastomer of the present invention, the average chain length of the polyester unit which is a hard segment constituent component is preferably 5 to 20, more preferably 7 to 18, further preferably 9 to 16.

In the polyester-polycarbonate type thermoplastic polyester elastomer of the present invention, the average chain length of a polyester unit in the hard segment (x) is an important factor which determines blocking property of the polyester-polycarbonate type thermoplastic polyester elastomer, and greatly influences on the melting point of the polyester-polycarbonate type thermoplastic polyester elastomer. In general, as the average chain length of the polyester unit (x) is increased, the melting point of the polyester-polycarbonate type thermoplastic polyester elastomer rises. In addition, the average chain length of the polyester unit in the hard segment (x) is also a factor influencing on mechanical properties of the polyester-polycarbonate type thermoplastic polyester elastomer. When the average chain length of the polyester unit in the hard segment (x) is smaller than 5, it is meant that randomization proceeds and, therefore, heat resistance and mechanical properties such as a hardness, a tensile strength, and an elastic modulus is greatly deteriorated. When the average chain length of the polyester unit in the hard segment (x) is larger than 20, compatibility with aliphatic carbonate diol constituting the soft segment becomes worse to cause phase separation and, thereby, mechanical properties are greatly influenced, resulting in decrease in its strength and elongation.

Blocking property (B) is preferably 0.11 to 0.45, more preferably 0.13-0.40, further preferably 0.15 to 0.35. As this value becomes larger, the blocking property declines. It is not preferable that the blocking property is larger than 0.45 because polymer characteristics are deteriorated due to decline of the blocking property, for example, the melting point of the polyester-polycarbonate type thermoplastic polyester elastomer declines, and the like. On the other hand, it is not preferable that the blocking property is smaller than 0.11 because compatibility between the hard segment and the soft segment is deteriorated, resulting in deterioration in mechanical properties such as a strength and an elongation and flex resistance and the like of the polyester-polycarbonate type thermoplastic polyester elastomer, and increase in fluctuation of those mechanical properties.

Additionally, the blocking property is calculated by the following equation (1).

$$B=1/x+1/y \quad (1)$$

Based on the above relationship, the average chain length (y) of the soft segment is preferably 4 to 15.

Only by satisfying the blocking property, both excellent heat resistance and excellent mechanical properties can be simultaneously obtained.

A tensile strength at break of the polyester-polycarbonate type thermoplastic polyester elastomer of the present invention is 15 to 100 MPa, preferably 20 to 60 MPa.

In addition, a flexural modulus of the polyester-polycarbonate type thermoplastic polyester elastomer of the present invention is preferably 1000 MPa or lower, more preferably 800 MPa or lower, further preferably 600 MPa or lower. It is not preferable that the flexural modulus is more than 1000 MPa because flexibility of the polyester-polycarbonate type thermoplastic polyester elastomer is insufficient. The lower limit is preferably 50 MPa or higher, more preferably 80 MPa or higher, further preferably 100 MPa or higher. When it is lower than 50 MPa, the polyester-polycarbonate type thermoplastic polyester elastomer is too flexible to secure a strength of products.

In addition, in the polyester-polycarbonate type thermoplastic polyester elastomer of the present invention, it is preferable that an elongation at break and a retention rate of the polyester-polycarbonate type thermoplastic polyester elastomer composition after heat-aging test and after water-aging test evaluated by a method described in a section [Measurement methods] is 50% or higher and 80% or higher, respectively.

The polyester-polycarbonate type thermoplastic polyester elastomer of the present invention is molded from a melt by ordinary molding techniques such as injection molding, flat film extrusion, extrusion blow molding or co-extrusion.

In addition, various additives may be added to the polyester-polycarbonate type thermoplastic polyester elastomer of the present invention, depending on purposes, to obtain a composition. As additives, known hindered phenol-type, sulfur-type, phosphorus-type, amine-type antioxidant, hindered amine-type, triazole-type, benzophenone-type, benzoate-type, nickel-type, salicyl-type and other types light stabilizers; antistatic agents; slipping agents; molecular weight modifiers such as peroxide and the like; compounds having a reactive group such as an epoxy-type compound, an isocyanate-type compound, a carbodiimide-type compound and the like; metal inactivation agents; organic or inorganic nucleating agents cores; neutralizers; acid retarder; antibacterial agents; fluorescent whitener; fillers; flame retardant; flame retardant assistants; organic or inorganic pigments; and others may be added.

Hindered phenol-type antioxidants which may be used in the present invention include 3,5-di-t-butyl-4-hydroxy-toluene, n-octadecyl-β-(4'-hydroxy-3',5'-di-t-butylphenyl)propionate, tetrakis[methylene-3-(3',5'-di-t-butyl-4'-hydroxyphenyl)propionate]methane, 1,3,5-trimethyl-2,4,6'-tris(3,5-di-t-butyl-4-hydroxybenzyl)benzene, calcium (3,5-di-t-butyl-4-hydroxy-benzyl-monoethyl-phosphate), triethylene glycol-bis[3-(3-t-butyl-5-methyl-4-hydroxyphenyl)propionate], pentaerythrityl-tetrakis[3-(3,5-di-t-butylanilino)-1,3,5-triazine, 3,9-bis[1,1-dimethyl-2-{β-(3-t-butyl-4-hydroxy-5-methylphenyl)propionyloxy}ethyl]2,4,8,10-tetraoxaspiro[5,5] undecane, bis[3,3-bis(4'-hydroxy-3'-t-butylphenyl)butyric acid]glycol ester, triphenol, 2,2'-ethylidene bis(4,6-di-t-butylphenol), N,N'-bis[3-(3,5-di-t-butyl-4-hydroxyphenyl)propionyl]hydrazine, 2,2'-oxamide bis[ethyl-3-(3,5-di-t-butyl-4-hydroxyphenyl)propionate], 1,1,3-tris(3',5'-di-t-butyl-4'-hydroxybenzyl)-S-triazine-2,4,6 (1H,3H,5H)-trione, 1,3,5-tris(4-t-butyl-3-hydroxy-2,6-dimethylbenzyl)isocyanurate, 3,5-di-t-butyl-4-hydroxyhydrocinnamic acid triester with 1,3,5-tris(2-hydroxyethyl)-S-triazine-2,4,6 (1H,3H,5H), N,N-hexamethylene bis(3,5-di-t-butyl-4-hydroxy-hydrocinnamide), 3,9-bis[2-{3-(3-t-butyl-4-hydroxy-5-methylphenyl)propionyloxy}-1,1-dimethylethyl]-2,4,8,10-tetraoxaspiro[5.5]undecane and the like.

Sulfur-type antioxidants which may be used in the present invention include dilauryl-3,3'-thiodipropionate, dimyristyl-3,3'-thiodipropionate, distearyl-3,3'-thiodipropionate, lauryl stearyl-3,3'-thiodipropionate, dilauryl thiodipropionate, dioctadecyl sulfide, pentaerythritol-tetra(β-lauryl-thiopropionate) ester and the like.

Phosphorus-type antioxidants which may be used in the present invention include tris(mixed, mono- and di-Norylphenyl)phosphite, tris(2,3-di-t-butylphenyl)phosphite, 4,4'-butylidene bis(3-methyl-6-t-butylphenyl-di-tridecyl) phosphite, 1,1,3-tris(2-methyl-4-di-tridecylphosphite-5-t-butylphenyl)butane, tris(2,4-di-t-butylphenyl)phosphite, bis(2,4-di-t-butylphenyl)pentaerythritol diphosphite, tetrakis(2,4-di-t-butylphenyl)-4,4'-biphenylene phosphite, bis(2,6-di-t-butyl-4-methylphenyl)pentaerythritol-diphosphite, tetrakis (2,4-di-t-butylphenyl) 4,4'-biphenylene diphosphonite, triphenyl phosphite, diphenyldecyl phosphite, tridecyl phosphite, trioctyl phosphite, tridocecyl phosphite, trioctadecyl phosphite, trinonylphenyl phosphite, tridocecyl trithiophosphite and the like.

Amine-type antioxidants which may be used in the present invention include amines such as N,N-diphenylethylenediamine, N,N-diphenylacetoamidine, N,N-diphenylformamidine, N-phenylpiperidine, dibenzylethylenediamine, triethanolamine, phenothiazine, N,N'-di-sec-butyl-p-phenylenediamine, 4,4'-tetramethyldiaminodiphenylmethane, p,p'-dioctyl-diphenylamine, N,N'-bis(1,4-dimethylpentyl)-p-phenylenediamine, phenyl-α-naphthylamine, phenyl-β-naphthylamine, 4,4'-bis(4-α,α-dimethylbenzyl)diphenylamine and the like; their derivatives; reaction products of amine and aldehyde; reaction products of amine and ketone.

Hindered amine-type light stabilizers which may be used in the present invention include polycondensates of dimethyl succinate with 1-(2-hydroxyethyl)-4-hydroxy-2,2,6,6-tetramethylpiperidine, poly[[6-(1,1,3,3-tetrabutyl)imino-1,3,5-triazin-2,4-diyl]hexamethylene [(2,2,6,6-tetramethyl-4-piperidyl)imyl]], bis(1,2,2,6,6-pentamethyl-4-piperidyl) 2-n-butylmalonate, tetrakis(2,2,6,6-tetramethyl-4-piperidyl) 1,2,3,4-butanetetracarboxylate, bis(2,2,6,6-tetramethyl-4-piperidyl)sebacate, polycondensates of N,N'-bis(2,2,6,6-tetramethyl-4-piperidyl)hexamethylenediamine and 1,2-dibromoethane, poly[(N,N'-bis(2,2,6,6-tetramethyl-4-piperidyl)hexamethylenediamine)-(4-molpholino-1,3,5-triazin-2,6-diyl)-bis(3,3,5,5-tetramethylpiperazinone)], tris(2,2,6,6-tetramethyl-4-piperidyl)-docecyl-1,2,3,4-butanetetracarboxylate, tris(1,2,2,6,6-pentamethyl-4-piperidyl)-docecyl-1,2,3,4-butanetetracarboxylate, bis(1,2,2,6,6-pentamethyl-4-piperidyl)sebacate, 1,6,11-tris[{4,6-bis(N-butyl-N-(1,2,2,6,6-pentamethylpiperidin-4-yl)amino-1,3,5-triazin-2-yl)amino}undecane, 1-[2-(3,5-di-t-butyl-4-hydroxyphenyl)propionyloxy]-2,2,6,6-tetramethylpiperidine, 8-benzyl-7,7,9,9-tetramethyl-3-octyl-1,3,8-triazaspiro[4,5]undecane-2,4-dione, 4-benzoyloxy-2,2,6,6-tetramethylpiperidine, N,N'-bis(3-aminopropyl)ethylenediamine-2,4-bis[N-butyl-N-(1,2,2,6,6-pentamethyl-4-piperidyl)amino]-6-chloro-1,3,5-triazine condensate.

Benzophenone-type, benzotriazole-type, triazole-type, nickel-type and salicyl-type light stabilizers which may be used in the present invention include light stabilizers such as 2,2'-di-hydroxy-4-methoxybenzophenone, 2-hydroxy-4-n-octyloxybenzophenone, p-t-butylphenyl salicylate, 2,4-di-t-butylphenyl-3,5-di-t-butyl-4-hydroxybenzoate, 2-(2'-hydroxy-5'-methylphenyl)benzotriazole, 2-(2'-hydroxy-3',5'-di-t-amyl-phenyl)benzotriazole, 2-[2'-hydroxy-3',5'-bis(α,α-dimethylbenzylphenyl)benzotriazole, 2-(2'-hydroxy-3'-t-butyl-5'-methylphenyl)-5-chlorobenzoazotriazole, 2-(2'-hydroxy-3',5'-di-t-butylphenyl)-5-chlorobenzothiazole, 2,5-bis[5'-t-butylbenzooxazolyl-(2)]-thiophene, nickel bis(monoethyl 3,5-di-t-butyl-4-hydroxybenzylphosphate), a mixture of bisanilide 2-ethoxy-5-t-butyl-2'-ethyloxalate 85 to 90% and bisanilide 2-ethoxy-5-t-butyl-2'-ethyl-4'-t-butyloxalate 10 to 15%, 2-[2-hydroxy-3,5-bis(α,α-dimethylbenzyl)phenyl]-2H-benzotriazole, bisanilide 2-ethoxy-2'-ethyloxalate, 2-[2'-hydroxy-5'-methyl-3'-(3",4",5",6"-tetrahydrophthalimido-methyl)phenyl]benzotriazole, bis(5-benzoyl-4-hydroxy-2-methoxyphenyl)methane, 2-(2'-hydroxy-5'-t-octylphenyl)benzotriazole, 2-hydroxy-4-i-octyloxybenzophenone, 2-hydroxy-4-dodecyloxybenzophenone, 2-hydroxy-4-octadecyloxybenzophenone, phenyl salicylate and the like.

Slipping agents which may be used in the present invention include hycrocarbon-type, fatty acid-type, fatty acid amide-type, ester-type, alcohol-type, metal soap-type, natural wax-type, silicone-type, fluorine-type compounds and the like. Specifically, included are slipping agents such as liquid paraffin, synthetic paraffin, synthetic hard paraffin, synthetic isoparaffin petroleum hydrocarbon, chlorinated paraffin, paraffin wax, microcrystalline wax, low-polymerization-degree polyethylene, fluorocarbon oil, fatty acid compounds having a carbon number of 12 or more such as lauric acid, myristic acid, palmitic acid, stearic acid, arachidic acid, behenic acid and the like, saturated or unsaturated aliphatic amides such as having a carbon number of 3 to 30, hexylamide, octylamide, stearylamide, palmitylamide, oleylamide, erucylamide, ethylene bisstearylamide, laurylamide, behenylamide, methylene bisstearylamide and ricinol amide, and their derivatives, a lower alcohol ester of fatty acid, a polyhydric alcohol ester of fatty acid, a polyglycol ester of fatty acid, a fatty alcohol ester of fatty acid such as butyl stearate, hydrogenated castor oil, ethylene glycol monostearate and the like, cetyl alcohol, stearyl alcohol, ethylene glycol, polyethylene glycols having a molecular weight of 200 to 10000 or higher, polyglycerol, carnauba wax, candelilla wax, montan wax, dimethylsilicone, silicone gum, ethylene tetrafluoride and the like. In addition, metal salts of a compound containing linear saturated fatty acid, an acid at a side chain, sinolic acid, wherein the metal is selected from Li, Mg, Ca, Sr, Ba, Zn, Cd, Al, Sn and Pb may be also included.

Fillers which may be used in the present invention include oxides such as magnesium oxide, aluminium oxide, silicon oxide, calcium oxide, titanium oxide (rutile type, anatase type), chromium oxide (trivalent), iron oxide, zinc oxide, silica, diatomaceous earth, alumina fiber, antimony oxide, barium ferrite, strontium ferrite, beryllium oxide, pumice, pumice balloon and the like, basic substances or hydroxides such as magnesium hydroxide, aluminium hydroxide, basic magnesium carbonate and the like, salts of carbonic acid such as magnesium carbonate, calcium carbonate, barium carbonate, ammonium carbonate, calcium sulfite, dolomite, dowsonite and the like, salts of sulfurous acid or sulfuric acid such as calcium sulfate, barium sulfate, ammonium sulfate, calcium sulfite, basic magnesium sulfate and the like, salts of silicic acid such as sodium silicate, magnesium silicate, aluminium silicate, potassium silicate, calcium silicate, talc, clay, mica, asbestos, glass fibers, montmorillonite, glass balloons, glass beads, pentonite and the like, kaolin (clay for earthen wares), pearlite, iron powder, copper powder, lead powder, aluminium powder, tungsten powder, molybdenum sulfide, carbon black, boron fibers, silicon carbide fibers, brass fibers, potassium titanate, lead titanate zirconate, zinc borate, aluminium borate, barium metaborate, calcium borate, sodium borate, and others.

Flame retardant assistants which may be used in the present invention include antimony trioxide, antimony tetraoxide, antimony pentaoxide, sodium pyroantimonate, tin dioxide, zinc metaborate, aluminium hydroxide, magnesium hydroxide, zirconium oxide, molybdenum oxide, red phosphorus compounds, ammonium polyphosphate, melamine cyanurate, ethylene tetrafluoride and the like.

Compounds having a triazine group and/or their derivatives which may be used in the present invention include melamine, melamine cyanurate, melamine phosphate, guanidine sulfamate and the like.

In phosphorus compounds which may be used in the present invention, inorganic phosphorus compounds include red phosphorus compounds, ammonium polyphosphate and the like. Red phosphorus compounds include resin-coated red phosphorus, complex compounds with aluminium, and the like. Organic phosphorus compounds include phosphoric acid ester, melamine phosphate and the like. As phosphoric acid esters, phosphates, phosphonates and phosphinates such as trimethyl phosphate, triethyl phosphate, tributyl phosphate, trioctyl phosphate, trioctyl phosphinate, tributoxyethyl phosphate, octyldiphenyl phosphate, tricresyl phosphate, cresyl diphenyl phosphate, triphenyl phosphate, trixylenyl phosphate, trisisopropylphenyl phosphate, diethyl N,N-bis (2-hydroxyethyl)aminomethyl phosphonate, bis(1,3-phenylenediphenyl)phosphate; aromatic condensed phosphoric acid ester such as 1,3-[bis(2,6-dimethylphenoxy)phosphenyloxy]benzene, 1,4-[bis(2,6-dimethylphenoxy)phosphenyloxy]benzene; and others are preferable from a view point of hydrolysis resistance, thermal stability and flame resistance.

These additives may be compounded by using kneading machines such as heating rolls, extruders, Banbury mixers and the like. These additives may be added to or mixed with oligomers before transesterification when preparing a polyester-polycarbonate type thermoplastic polyester elastomer resin composition or before polycondensation.

EXAMPLE

The present invention will be specifically explained below with referring to Examples and Comparative Examples, but is not limited to them. Additionally, each measurement in the present invention was carried out according to the following manners.

(1) Reduced Viscosity of Polyester-Polycarbonate Type Thermoplastic Polyester Elastomer In 25 mL of a mixed solvent (phenol/tetrachloroethane=60/40 (mass ratio)) was dissolved 0.05 g of a polyester-polycarbonate type thermoplastic polyester elastomer, and the viscosity was measured at 30° C. using an Ostwald viscometer.

(2) Melting Point of Polyester-Polycarbonate Type Thermoplastic Polyester Elastomer (Tm)

A polyester-polycarbonate type thermoplastic polyester elastomer dried under reduced pressure at 50° C. for 15 hours was subjected to measurement on a differential scanning carolimeter DSC-50 (manufactured by SHIMADZU CORPORATION) at the heating rate of 20° C./min. from room temperature. The temperature at an endotherm peak due to melting was defined as the melting point.

Additionally, measurement samples were subjected to measurements by placing 10 mg in an aluminium pan (P/N 900793.901, manufactured by TA INSTRUMENTS) and by sealing it with an aluminium lid (P/N 900794.901, manufactured by TA INSTRUMENTS) under argon atmosphere.

(3) Tensile Strength and Elongation at Break of Polyester-Polycarbonate Type Thermoplastic Polyester Elastomer A tensile strength and an elongation at break of a polyester-polycarbonate type thermoplastic polyester elastomer were measured according to JIS K 6251. Test pieces of #3 dumbbell type were prepared by injection molding into flat plates having the dimension of 100 mm×100 mm×2 mm on an injection molding machine (model-SAV, manufactured by SANJO SEIKI Co., Ltd.) at the cylinder temperature of (Tm+20° C.) and at the mold temperature of 30° C. and by stamping the flat plates.

(4) Flexural Modulus

A flexural modulus of a polyester-polycarbonate type thermoplastic polyester elastomer was measured according to ASTM D790.

(5) Heat-Aging Resistance (Retention Rate of Elongation at Break after Heat-Aging Test)
<Preparation of Test Piece>

In a drum tumbler were placed 100 parts by mass of pellets of a polyester-polycarbonate type thermoplastic polyester elastomer dried under reduced pressure at 100° C. for 8 hours, 0.35 parts by mass of a multifunctional epoxy compound, 0.2 parts by weight of a catalyst, and 1.2 parts by mass of a stabilizer, and they were mixed at room temperature for 30 minutes. The mixture was melted and kneaded at the temperature of (Tm+20° C.) and extruded in a strand by using a 40-mmφ co-rotating double screw extruder with a vent. The strand was cut into chips with water cooling. The chips were dried under reduced pressure at 100° C. to obtain chips of the polyester-polycarbonate type thermoplastic polyester elastomer composition.

Test pieces of #3 dumbbell type were prepared by injection molding the polyester-polycarbonate type thermoplastic polyester elastomer into flat plates having the dimension of 100 mm×100 mm×2 mm using an injection molding machine (model-SAV, manufactured by SANJO SEIKI Co., Ltd.) at the cylinder temperature of (Tm+20° C.) and at the mold temperature of 30° C. and by stamping the flat plates.
<Dry-Heating Treatment, Evaluation of Ability to Retain Elongation at Break>

The test pieces obtained in the above were treated in a Gear type hot air dryer at 180° C. and for 1000 hours and, then, an elongation at break was measured according to JIS K 6251. Also for the untreated test pieces, an elongation at break was measured in the same manner to calculate the retention rate of the elongation at break after dry-heating treatment.

(6) Water-Aging Resistance (Retention Rate of Elongation at Break after Water-Aging Test)
<Preparation of Test Piece>

Test pieces were prepared by the same manner described in the method for measuring heat-aging resistance.
<Boiling-Water Treatment, Evaluation of Ability to Retain Elongation at Break>

The test pieces were treated in boiling water at 100° C. and for 2 weeks and, then, an elongation at break was measured according to JIS K 6251. Also for the untreated test pieces, an elongation at break was measured in the same manner to calculate the retention rate of the elongation at break after boiling-water treatment.

(7) Average Chain Length and Blocking Property of Hard Segment and Soft Segment (when the Glycol Component in Polyester is Butanediol and the Glycol in Aliphatic Polycarbonate Diol is Aliphatic Diol Having a Carbon Number of 5-12)
<NMR Measurement>
Equipment: Fourier-Transform Nuclear Magnetic Resonance System (ADVANCE 500 manufactured by BRUKER)
  Solvent: Deuteriated chloroform
  Concentration of sample solution: 3-5 vol %
  $^1$H resonance frequency: 500.13 MHz
  Flip angle of detection pulse: 45°
  Data sampling rate: 4 seconds
  Delay time: 1 second
  Integration number: 50-200 times
  Measurement temperature: Room temperature
<Calculation Method>

The H-NMR integration value. (arbitrary unit) of a peak for methylene groups next to oxygen atoms, of butanediol in a linkage of aromatic dicarboxylic acid-butane diol-aromatic dicarboxylic acid was defined as A.

The H-NMR integration value (arbitrary unit) of a peak for a methylene group next to an oxygen atom closer to carbonic acid, of butanediol in a linkage of aromatic dicarboxylic acid-butanediol-carbonic acid was defined as C.

The H-NMR integration value (arbitrary unit) of a peak for a methylene group next to an oxygen atom closer to aromatic dicarboxylic acid, of hexanediol in a linkage of aromatic dicarboxylic acid-aliphatic diol having a carbon number of 5 to 12-carbonic acid was defined as B.

The H-NMR integration value (arbitrary unit) of a peak for methylene groups next to an oxygen atom, of aliphatic diol having a carbon number of 5 to 12 in a linkage of carbonic acid-aliphatic diol having a carbon number of 5 to 12-carbonic acid was defined as D.

The hard segment average chain length (x) is defined as follows.

$$x=(((A/4)+(C/2))/((B/2)+(C/2)))\times 2$$

The soft segment average chain length (y) is defined as follows.

$$y=(((D/4)+(B/2))/((B/2)+(C/2)))\times 2.$$

Blocking property (B) is calculated by the following equation (1) by using x and y values obtained by the above equations. Smaller B values indicate higher blocking properties.

$$B=1/x+1/y \quad (1)$$

(9) Blocking Property Retainability

Measurement samples were prepared by weighing 10 mg of a polyester-polycarbonate type thermoplastic polyester elastomer dried under reduced pressure at 50° C. and for 15 hours into an aluminium pan (P/N 900793.901, manufactured by TA INSTRUMENTS) and by sealing it with an aluminium lid (P/N 900794.901, manufactured by TA INSTRUMENTS). The measurement pan was heated on a differential scanning carolimeter DSC-50 (manufactured by SHIMADZU CORPORATION) under nitrogen atmosphere from room temperature to 300° C. at the heating rate of 20° C./min., maintained at 300° C. for 3 minutes and, then, the pan was removed to rapidly cool by dipping into liquid nitrogen. The sample was removed from liquid nitrogen and allowed to stand at room temperature for 30 minutes. The measurement pan was set on the differential scanning calorimeter and, after allowing to stand 30 minutes at room temperature, it was heated again from room temperature to 300° C. at the heating rate of 20° C./min. After this cycle was repeated three times, the melting point difference (Tm1–Tm3) between the melting point obtained in first measurement (Tm1) and the melting point obtained in third measurement (Tm3) was calculated. The melting point difference was defined as blocking property retainability. As the difference becomes smaller, blocking property retainability is more excellent.

Based on the melting point difference, blocking property retainability was judged using the following criteria:
◎: Melting Point Difference is 0—lower than 30° C.,
○: Melting Point Difference is 30—lower than 40° C.
Δ: Melting Point Difference is 40—lower than 50° C.
X: Melting Point Difference is 50° C. or higher.

(9) Molecular Weight of Aliphatic Polycarbonate Diol

An aliphatic polycarbonate diol sample was dissolved in deuteriated chloroform ($CDCl_3$) and H-NMR of end groups was measured in the same manner described in (8) and its molecular weight was calculated by the following equation:

Molecular weight=1000000/((end group concentration (eq/ton))/2)

(10) Concentration of Hydroxyl Endo Group of Aromatic Polyester

In 0.1 ml of deuteriated hexafluoroisopropanol (HFIP-d2)+deuteriated chloroform $CDCl_3$(1+1) was dissolved 15 ml of a sample, this was diluted with 0.42 ml of $CDCl_3$ containing 0.0125M triethylamine (TEA), 30 μl of heavy pyridine was added, and H-NMR was measured according to the method described in (7).

(11) Number Average Molecular Weight (Mn) of Aromatic Polyester

The number average molecular weight (Mn) of an aromatic polyester was calculated according to the following equation using the reduced viscosity ($\eta sp/c$) in the same manner as the above reduced viscosity measurement method for the thermoplastic polyester elastomer.

$$\eta sp/c = 1.019\times 10^{-4}\times Mn^{0.8929} - 0.0167$$

Example 1

Into an estrification reaction tank of a general-use polyester production apparatus consisting of one estrification reaction tank and two polycondensation reaction tanks were charged 100 parts by mass of aliphatic polycarbonate diol (carbonate diol UH-CARB200, manufactured by Ube Industries, Ltd., molecular weight 2000, 1,6-hexanediol type) and 8.6 parts by mass of diphenyl carbonate, and materials were homogeneously mixed, and transferred to an initial polycondensation reaction tank. After completion of transfer, the temperature of the initial polycondensation reaction tank was gradually raised, and the tank was heated at the temperature of 205° C. Thereafter, the pressure was gradually reduced, followed by a reaction at 130 Pa to perform a reaction of increasing the molecular weight of aliphatic polycarbonate diol. After two hours, the content was transferred to a later polycondensation reaction tank. The molecular weight of aliphatic polycarbonate at transfer was 10000. The later polycondensation reaction tank was charged with 236.4 parts by weight of chips of polybutylene terephthalate (PBT) having the number average molecular weight of 30000, and the moisture amount of 80 ppm, and the temperature was gradually raised to 245° C., while stirring. The pressure in a can was retained at 130 Pa and, after the internal temperature reached 245° C., it was confirmed that the resin became transparent in one hour, to complete a blocking reaction. The content was removed, and cooled to obtain a polyester-polycarbonate type thermoplastic polyester elastomer. Each physical property of the resulting polyester-polycarbonate type thermoplastic polyester elastomer was measured. Results are shown in Table 1. The polyester-polycarbonate type thermoplastic polyester elastomer obtained in the present Example exhibited all good properties, and was of high quality.

Example 2

According to the same manner as that of Example 1 except that the charging amount of diphenyl carbonate was changed to 9.6 parts by mass in the method of Example 1, to obtain aliphatic polycarbonate having the increased number average molecular weight of 20000, and the blocking reaction time was changed to 1.5 hours, a polyester-polycarbonate type thermoplastic polyester elastomer of Example 2 was obtained. Results are shown in Table 1. The polyester-polycarbonate type thermoplastic polyester elastomer obtained in the present Example had equivalent quality to that of the polyester-polycarbonate type thermoplastic polyester elastomer obtained in Example 1, and was of high quality.

Example 3

According to the same manner as that of Example 2 except that the charging amount of diphenyl carbonate was changed to 10.5 parts by mass, and the reaction time for increasing the molecular weight of aliphatic polycarbonate diol was changed to 1.5 hours, to obtain aliphatic polycarbonate having the increased number average molecular weight of 50000, and chips were changed to chips of polybutylene terephthalate (PBT) having the number average molecular weight of 20000 in the method of Example 2, a polyester-polycarbonate type thermoplastic polyester elastomer of Example 3 was obtained. Results are shown in Table 1. The polyester-polycarbonate type thermoplastic polyester elastomer obtained in the present Example had equivalent quality to that of the polyester-polycarbonate type thermoplastic polyester elastomer obtained in Example 2, and was of high quality.

Example 4

According to the same manner as that of Example 1 except that the aliphatic copolymerized polycarbonate diol was changed to aliphatic copolymerized polycarbonate diol (polycarbonate diol T5652, manufactured by Asahi Kasei Chemicals Corporation, molecular weight 2000, copolymer of 1,6-hexanediol and caprolactone, amorphous in the method of Example 1), a polyester-polycarbonate type thermoplastic polyester elastomer of Example 4 was obtained. Results are shown in Table 1.

The polyester-polycarbonate type thermoplastic polyester elastomer obtained in the present Example had equivalent quality to that of the polyester-polycarbonate type thermoplastic polyester elastomer obtained in Example 1, and was of high quality.

Example 5

According to the same manner as that of Example 1 except that chips of polybutylene naphthalate (PBN: naphthalate part was 2,6 body) having the number average molecular weight of 30000 were used in place of PBT chips, and the blocking reaction temperature was changed to 265° C. in the method of Example 1, a polyester-polycarbonate type thermoplastic polyester elastomer of Example 5 was obtained. Results are shown in Table 1.

The polyester-polycarbonate type thermoplastic polyester elastomer obtained in the present Example had equivalent blocking property and blocking property retainability to those of the polyester-polycarbonate type thermoplastic polyester elastomer obtained in Example 1, and had the higher melting point than that of the polyester-polycarbonate type thermoplastic polyester elastomer obtained in Example 1, and was of higher quality.

Example 6

According to the same manner as that of Example 1 except that charging of raw materials was changed to 100 parts by mass of aliphatic polycarbonate diol (carbonate diol UH-CARB200, manufactured by Ube Industries, Ltd., molecular weight 2000, 1,6-hexanediol type) and 10.1 parts by mass of 4,4'-diphenylmethane diisocyanate, and a reaction of increasing the molecular weight of aliphatic polycarbonate diol was performed at 180° C. for 2 hours under the nitrogen atmosphere, a polyester-polycarbonate type thermoplastic polyester elastomer of Example 6 was obtained. Results are shown in Table 1. A molecular weight of aliphatic polycarbonate at transfer to the blocking reaction tank was 10000.

The polyester-polycarbonate type thermoplastic polyester elastomer obtained in the present Example had equivalent quality to that of the polyester-polycarbonate type thermoplastic polyester elastomer obtained in Example 1, and was of high quality.

Example 7

According to the same manner as that of Example 1 except that charging of raw materials was changed to 100 parts by mass of aliphatic polycarbonate diol (carbonate diol UH-CARB200, manufactured by Ube Industries, Ltd., molecular weight 2000, 1,6-hexanediol type) and 8.7 parts by mass of pyromellitic dianhydride, and a reaction of increasing the molecular weight of aliphatic polycarbonate diol was performed at the temperature of 205° C. and 130 Pa for 2 hours, a polyester-polycarbonate type thermoplastic polyester elastomer of Example 7 was obtained. Results are shown in Table 1. The molecular weight of aliphatic polycarbonate at transfer to the blocking reaction tank was 10000.

The polyester-polycarbonate type thermoplastic polyester elastomer obtained in the present Example had equivalent quality to that of the polyester-polycarbonate type thermoplastic polyester elastomer obtained in Example 1, and was of high quality.

Example 8

Into an esterification reaction tank of a general-use polyester production apparatus consisting of one esterification reaction tank and two polycondensation reaction tanks were charged 100 parts by mass of aliphatic polycarbonate diol (carbonate diol UH-CARB200, manufactured by Ube Industries, Ltd., molecular weight 2000, 1,6-hexanediol type) and 9.6 parts by mass of diphenyl carbonate, and materials were homogeneously mixed, and transferred to an initial polycondensation reaction tank. After completion of transfer, the temperature of the initial polycondensation reaction tank was gradually raised, and the mixture was heated at 205° C. Thereafter, a pressure was gradually reduced, followed by a reaction at 130 Pa to perform a reaction of increasing the molecular weight of aliphatic polycarbonate diol. After two hours, the content was transferred to a later polycondensation reaction tank. The molecular weight of polycarbonate at transfer was 20000. Into the later polycondensation reaction tank was charged 134.3 parts by mass of chips of polybutylene terephthalate (PBT) having the number average molecular weight of 30000 and the moisture amount of 80 ppm, and the temperature was gradually raised to 230 to 240° C. while stirring. The pressure in the can was retained at 130 Pa and, after the internal temperature reached 240° C., it was confirmed that the resin became transparent in one hour, and the blocking reaction was completed. The content was removed, and cooled to obtain a polyester-polycarbonate type thermoplastic polyester elastomer. Each physical property of the resulting polyester-polycarbonate type thermoplastic polyester elastomer was measured, and results are shown in Table 2. The polyester-polycarbonate type thermoplastic polyester elastomer obtained in the present Example had all good properties, and was of high quality.

Example 9

According to the same manner as that of Example 8 except that charging was changed to 100 parts by mass of aliphatic polycarbonate, diol (carbonate diol UH-CARB200, manufactured by Ube Industries, Ltd., molecular weight 2000, 1,6-hexanediol type) and 10.0 parts by mass of diphenyl carbonate, and the amount of chips of polybutylene terephthalate (PBT) was changed to 101.3 parts by mass in the method of Example 8, a polyester-polycarbonate type thermoplastic polyester elastomer of Example 9 was obtained. Results are shown in Table 2. The polyester-polycarbonate type thermoplastic polyester elastomer obtained in the present Example had all good properties, and was of high quality.

Example 10

Into an esterification reaction tank of a general-use polyester production apparatus consisting of one esterification reaction tank and two polycondensation reaction tanks were charged 100 parts by mass of aliphatic polycarbonate diol (carbonate diol UH-CARB200, manufactured by Ube Industries, Ltd., molecular weight 2000, 1,6-hexanediol type) and 9.6 parts by mass of diphenyl carbonate, and materials were homogeneously mixed, and transferred to an initial polycondensation reaction tank. After completion of transfer, the initial polycondensation reaction tank was heated to gradually raise the temperature to 205° C. Thereafter, the pressure was gradually reduced, followed by a reaction at 130 Pa to perform a reaction of increasing the molecular weight of aliphatic polycarbonate diol. After two hours, the content was transferred to a later polycondensation reaction tank. The molecular weight of aliphatic polycarbonate at transfer was 20000. Into the later polycondensation reaction tank was charged 236.4 parts by mass of chips of polybutylene terephthalate (PBT) having the number average molecular weight of 30000 and the moisture amount of 80 ppm, 0.34 parts by mass of trimethylol propane was added, and the temperature was gradually raised to 245° C. while stirring. The pressure in the can was retained at 130 Pa and, after the internal temperature reached 245° C., it was confirmed that the resin became transparent in 1 hour, and the blocking reaction was completed. The content was removed, and cooled to obtain a polyester-polycarbonate type thermoplastic polyester elastomer. Each physical property of the resulting polyester-polycarbonate type thermoplastic polyester elastomer was measured, and results are shown in Table 2. The polyester-polycarbonate type thermoplastic polyester elastomer obtained in the present Example had all good properties, and was of high quality.

Comparative Example 1

Without performing reactions in the esterification reaction tank and the initial polycondensation reaction tank in the method of Example 1, 100 parts by mass of polybutylene terephthalate (PBT) having the number average molecular weight of 30000 and 43 parts by mass of polycarbonate diol (polycarbonate diol UH-CARB200, manufactured by Ube Industries, Ltd.) were charged into the later polycondensation reaction tank, and the temperature was gradually raised to 245° C. while stirring. The pressure in the can was retained at 130 Pa and, after the internal temperature reached 245° C., it was confirmed that the resin became transparent in 10 minutes, and the content was removed, and cooled to obtain a polyester-polycarbonate type thermoplastic polyester elastomer. Results are shown in Table 2. The polyester-polycarbonate type thermoplastic polyester elastomer obtained in the present Comparative Example was inferior in blocking property and blocking property retainability. Further, the elastomer had the low reduced viscosity, and was inferior in heat aging resistance, and was of low quality. In addition, since the molecular weight was low, a flexural modulus could not be measured.

Comparative Example 2

Without performing reactions in the esterification reaction tank and the initial polycondensation reaction tank in the method of Example 4, 100 parts by mass of polybutylene terephthalate (PBT) having the number average molecular weight of 30000, and 43 parts by mass of aliphatic copolymerized polycarbonate diol (polycarbonate diol T5652, manufactured by Asahi Kasei Chemicals Corporation, molecular weight 2000, copolymer of 1,6-hexanediol and caprolactone, amorphous) were charged into a reaction can in the later polycondensation reaction tank, and the temperature was gradually raised to 245° C. while stirring. The pressure in the can was retained at 130 Pa and, after the internal temperature reached 245° C., it was confirmed that the resin became transparent in 10 minutes, and the content was removed, and cooled to obtain a polyester-polycarbonate type thermoplastic polyester elastomer. Results are shown in Table 2.

The polyester-polycarbonate type thermoplastic polyester elastomer obtained in the present Comparative Example was inferior in blocking property and blocking property retainability, and was of low quality as compared with the polyester-polycarbonate type thermoplastic polyester elastomer obtained in Example 4. In addition, since the molecular weight was low, a flexural modulus could not be measured.

Example 11

According to the method of Example 1, at transfer of the product of the reaction of increasing the molecular weight of aliphatic polycarbonate diol to the later polycondensation reaction tank, PBT used in Example 1 was simultaneously charged through another supply port in the molten state using a biaxial extruder and, according to the same manner as that of Example 1, a polyester-polycarbonate type thermoplastic polyester elastomer of Example 11 was obtained. Results are shown in Table 3.

The polyester-polycarbonate type thermoplastic polyester elastomer obtained in the present Example had equivalent quality to that of the polyester-polycarbonate type thermoplastic polyester elastomer obtained in Example 1, and was of high quality.

Example 12

In the method of Example 1, 236.4 parts by mass of the PBT chips used in Example 1 were charged into the later polycondensation reaction tank in advance, they were melted at 245° C. and the pressure in the can of 130 Pa, and was returned to the normal pressure with nitrogen prior to transfer. According to the same manner as that of Example 1 except that aliphatic polycarbonate having the molecular weight which had been increased by the same method as that of Example 1 was transferred to the later polycondensation reaction tank and, after completion of the transfer, the blocking reaction was performed, a polyester-polycarbonate type thermoplastic polyester elastomer of Example 12 was obtained. Results are shown in Table 3.

The polyester-polycarbonate type thermoplastic polyester elastomer obtained in the present Example had equivalent quality to that of the polyester-polycarbonate type thermoplastic polyester elastomer obtained in Example 1, and was of high quality.

Example 13

According to the same manner as that of Example 11 except that the same polyester production apparatus as the general-use polyester production apparatus used in Example 1 was provided, and PBT produced in the one production apparatus was charged in the molten state in the method of Example 1, a polyester-polycarbonate type thermoplastic polyester elastomer of Example 13 was obtained. Results are shown in Table 3.

The polyester-polycarbonate type thermoplastic polyester elastomer obtained in the present Example had equivalent quality to that of the polyester-polycarbonate type thermoplastic polyester elastomer obtained in Example 11, and was of high quality.

Example 14

According to the same manner as that of Example 1 except that a procedure of mixing aliphatic polycarbonate diol and diphenyl carbonate in the esterification reaction tank was omitted, aliphatic polycarbonate diol and diphenyl carbonate were charged into the initial polycondensation reaction tank, and a reaction of increasing the molecular weight of aliphatic polycarbonate diol was initiated, a polyester-polycarbonate type thermoplastic polyester elastomer of Example 14 was obtained. Results are shown in Table 3.

The polyester-polycarbonate type thermoplastic polyester elastomer obtained in the present Example had equivalent quality to that of the polyester-polycarbonate type thermoplastic polyester elastomer obtained in Example 1, and was of high quality.

Example 15

According to the same manner as that of Example 6 except that using the general-use polyester production apparatus consisting of each one of the esterification reaction tank and the polycondensation reaction tank, aliphatic polycarbonate diol and 4,4'-diphenylmethane diisocyanate were supplied to the esterification reaction tank through separate supply ports, and a reaction of increasing the molecular weight of aliphatic polycarbonate diol was performed in the esterification reaction tank, and the blocking reaction was performed in the polycondensation reaction tank, a polyester-polycarbonate type thermoplastic polyester elastomer of Example 15 was obtained. Results are shown in Table 3.

The polyester-polycarbonate type thermoplastic polyester elastomer obtained in the present Example had equivalent quality to that of the polyester-polycarbonate type thermoplastic polyester elastomer obtained in Example 6, and was of high quality.

Example 16

According to the method of Example 1, the product of the reaction of increasing the molecular weight of aliphatic polycarbonate diol was transferred to a storage tank, and was stored at 150° C. under the nitrogen atmosphere. A few batches were stored. Thereafter, according to the same manner as that of Example 1 except that 101.3 parts by mass of the molecular weight increasing reaction product was transferred to the later polycondensation reaction tank using a metering pump, a polyester-polycarbonate type thermoplastic polyester elastomer of Example 16 was obtained. Results are shown in Table 3.

The polyester-polycarbonate type thermoplastic polyester elastomer obtained in the present Example had equivalent quality to that of the polyester-polycarbonate type thermoplastic polyester elastomer obtained in Example 1, and was of high quality.

Example 17

Into an esterification reaction tank of a general-use polyester production apparatus consisting of one esterification reaction tank and two polycondensation reaction tanks were charged 100 parts by mass of aliphatic polycarbonate diol (carbonate diol UH-CARB200, manufactured by Ube Industries, Ltd., molecular weight 2000, 1,6-hexanediol type) and 8.6 parts by mass of diphenyl carbonate, and materials were homogeneously mixed and transferred to an initial polycondensation reaction tank. After completion of transfer, the temperature of the initial polycondensation reaction tank was heated to gradually raise the temperature to 205° C. Thereafter, the pressure was gradually reduced, followed by a reaction at 130 Pa to perform a reaction of increasing the molecular weight of aliphatic polycarbonate diol. After two hours, the content was transferred to a later polycondensation reaction tank. A molecular weight of aliphatic polycarbonate diol at transfer was 10000. Into the later polycondensation reaction tank was charged 236.4 parts by mass of polybutylene terephthalate (PBT) chips having the number average molecular weight of 30000, and the moisture amount of 80 ppm, and the temperature was gradually raised to 240° C. while stirring. The pressure in the can was retained at 130 Pa and, after the internal temperature reached 240° C., it was confirmed that the resin became transparent in one hour to complete a blocking reaction, 1.01 parts by mass of trimellitic anhydride was added, followed by stirring at the normal pressure for 15 minutes to complete the reaction. The content was removed, and cooled to obtain a polyester-polycarbonate type thermoplastic polyester elastomer. Each physical property of the resulting polyester-polycarbonate type thermoplastic polyester elastomer was measured. Results are shown in Table 4. The polyester-polycarbonate type thermoplastic polyester elastomer obtained in the present Example had all good properties, and was of high quality.

Example 18

Into an esterification reaction tank of a general-use polyester production apparatus consisting of one esterification reaction tank and two polycondensation reaction tanks were charged 100 parts by mass of aliphatic polycarbonate diol (carbonate diol UH-CARB200, manufactured by Ube Industries, Ltd., molecular weight 2000, 1,6-hexanediol type) and 10.0 parts by mass of diphenyl carbonate, and materials were homogeneously mixed, and transferred to an initial polycondensation reaction tank. After completion of transfer, the initial polycondensation reaction tank was heated to gradually raise the temperature to 205° C. Thereafter, the pressure was gradually reduced, followed by a reaction at 130 Pa to perform a reaction of increasing the molecular weight of aliphatic polycarbonate diol. After two hours, the content was transferred to a later polycondensation reaction tank. The molecular weight of aliphatic polycarbonate at transfer was 30000. Into the later polycondensation reaction tank was charged 101.3 parts by mass of chips of polybutylene terephthalate (PBT) having the number average molecular weight of 30000 and the moisture amount of 80 ppm, 0.32 parts by mass of trimethylolpropane was added, and the temperature was gradually raised to 240° C. while stirring. The pressure in the can was retained at 130 Pa and, after the internal temperature reached 240° C., it was confirmed that the resin became transparent in one hour, the blocking reaction was completed, 1.23 parts by mass of trimellitic anhydride was added, and the mixture was stirred at the normal temperature for 15 minutes, and the reaction was completed. The content was removed, and cooled to obtain a polyester-polycarbonate type thermoplastic polyester elastomer. Each physical property of the resulting polyester-polycarbonate type thermoplastic polyester elastomer was measured. Results are shown in Table 4. The polyester-polycarbonate type thermoplastic polyester elastomer obtained in the present Example had all good properties, and was of high quality.

Example 19

Into an esterification reaction tank of a general-use polyester production apparatus consisting of one esterification reaction tank and two polycondensation reaction tanks were charged 100 parts by mass of aliphatic polycarbonate diol (carbonate diol UH-CARB200, manufactured by Ube Industries, Ltd., molecular weight 2000, 1,6-hexanediol type), and 10.0 parts by mass of diphenyl carbonate, and materials were homogeneously mixed, and transferred to an initial polycondensation reaction tank. After completion of transfer, the initial polycondensation reaction tank was heated to gradually raise the temperature to 205° C. Thereafter, the pressure was gradually reduced, followed by a reaction at 130 Pa to perform a reaction of increasing the molecular weight of aliphatic polycarbonate diol. After two hours, the content was transferred to a later polycondensation reaction tank. The molecular weight of aliphatic polycarbonate at transfer was 30000. Into the later polycondensation reaction tank was charged 101.3 parts by mass of chips of polybutylene terephthalate (PBT) having the number average molecular weight of 30000 and the moisture amount of 80 ppm, and the temperature was gradually raised to 240° C. while stirring. The pressure in the can was retained at 130 Pa and, after the internal temperature reached 240° C., it was confirmed that the resin became transparent in one hour, the blocking reaction was completed, 0.95 parts by mass of Rikacid TMEG-200 (manufactured by New Japan Chemical Co., Ltd.) was added, the mixture was stirred at the normal pressure for 15 minutes, and the reaction was completed. The content was removed, and cooled to obtain a polyester-polycarbonate type thermoplastic polyester elastomer. Each physical property of the resulting polyester-polycarbonate type thermoplastic polyester elastomer was measured, and results are shown in Table 4. The polyester-polycarbonate type thermoplastic polyester elastomer obtained in the present Example had all good properties, and was of high quality.

TABLE 1

|  | Ex. 1 | Ex. 2 | Ex. 3 | Ex. 4 | Ex. 5 | Ex. 6 | Ex. 7 |
|---|---|---|---|---|---|---|---|
| Reduced Viscosity (dl/g) | 1.20 | 1.15 | 1.19 | 1.15 | 1.20 | 1.15 | 1.09 |
| Melting Point (° C.) | 213 | 218 | 216 | 213 | 224 | 208 | 211 |
| Average Chain Length of Hard Segment (n) | 11 | 15 | 13 | 12 | 8 | 9 | 10 |
| Average Chain Length of Soft Segment (m) | 8 | 9 | 9 | 8 | 5 | 6 | 7 |
| Blocking Property (B) | 0.22 | 0.18 | 0.19 | 0.21 | 0.33 | 0.28 | 0.24 |
| Block Property Retainability | ◎ | ◎ | ◎ | ◎ | ○ | ◎ | ◎ |
| Tensile Strength at Break (MPa) | 32.0 | 33.0 | 32.0 | 31.0 | 34.2 | 30.0 | 31.0 |
| Flexural Modulus (MPa) | 230 | 220 | 230 | 210 | 240 | 210 | 220 |
| Heat-Aging Resistance (Retention Rate: %) | 60 | 60 | 60 | 55 | 50 | 50 | 50 |
| Water-Aging Resistance (Retention Rate: %) | 97 | 95 | 98 | 95 | 95 | 90 | 95 |

TABLE 2

|  | Ex. 8 | Ex. 9 | Ex. 10 | Comp. Ex. 1 | Comp. Ex. 2 |
|---|---|---|---|---|---|
| Reduced Viscosity (dl/g) | 1.20 | 1.25 | 1.23 | 0.50 | 0.52 |
| Melting Point (° C.) | 206 | 202 | 212 | 190 | 190 |
| Average Chain Length of Hard Segment (n) | 8 | 5 | 11 | 4 | 4 |
| Average Chain Length of Soft Segment (m) | 6 | 4 | 8 | 2 | 2 |
| Blocking Property (B) | 0.29 | 0.45 | 0.22 | 0.75 | 0.75 |
| Block Property Retainability | ◎ | ○ | ◎ | X | X |
| Tensile Strength at Break (MPa) | 29.5 | 28.2 | 31.0 | 5 | 5 |
| Flexural Modulus (MPa) | 106 | 75 | 220 | — | — |
| Heat-Aging Resistance (Retention Rate: %) | 63 | 64 | 91 | 0 | 0 |
| Water-Aging Resistance (Retention Rate: %) | 95 | 96 | 96 | 75 | 70 |

TABLE 3

|  | Ex. 11 | Ex. 12 | Ex. 13 | Ex. 14 | Ex. 15 | Ex. 16 |
|---|---|---|---|---|---|---|
| Reduced Viscosity (dl/g) | 1.19 | 1.22 | 1.18 | 1.20 | 1.15 | 1.20 |
| Melting Point (° C.) | 214 | 215 | 214 | 211 | 209 | 215 |
| Average Chain Length of Hard Segment (n) | 12 | 13 | 12 | 10 | 9 | 13 |
| Average Chain Length of Soft Segment (m) | 8 | 9 | 8 | 7 | 6 | 9 |
| Blocking Property (B) | 0.21 | 0.19 | 0.21 | 0.24 | 0.28 | 0.19 |
| Block Property Retainability | ◎ | ◎ | ◎ | ◎ | ◎ | ◎ |
| Tensile Strength at Break (MPa) | 32.5 | 34.0 | 32.0 | 32.2 | 30.0 | 33.0 |
| Flexural Modulus (MPa) | 230 | 230 | 220 | 230 | 210 | 220 |
| Heat-Aging Resistance (Retention Rate: %) | 60 | 60 | 60 | 55 | 50 | 65 |
| Water-Aging Resistance (Retention Rate: %) | 98 | 97 | 96 | 95 | 90 | 98 |

TABLE 4

|  | Ex. 17 | Ex. 18 | Ex. 19 |
|---|---|---|---|
| Reduced Viscosity (dl/g) | 1.15 | 1.30 | 1.32 |
| Melting Point (° C.) | 215 | 208 | 209 |
| Average Chain Length of Hard Segment (n) | 13 | 6 | 7 |
| Average Chain Length of Soft Segment (m) | 9 | 7 | 10 |
| Blocking Property (B) | 0.19 | 0.31 | 0.24 |
| Block Property Retainability | ◎ | ◎ | ◎ |
| Tensile Strength at Break (MPa) | 33.0 | 27.5 | 28.5 |
| Flexural Modulus (MPa) | 220 | 80 | 80 |
| Heat-Aging Resistance (Retention Rate: %) | 60 | 67 | 66 |
| Water-Aging Resistance (Retention Rate: %) | 93 | 97 | 98 |

The polyester-polycarbonate type thermoplastic polyester elastomer according to the present invention has been explained above based on a plurality of Examples, but the present invention is not limited to the features described in the above Examples and the features may be appropriately modified by appropriately combining features described in respective Examples in the range that the gist is not departed.

INDUSTRIAL APPLICABILITY

The process for producing a polyester-polycarbonate type thermoplastic polyester elastomer of the present invention has an advantage that, by introducing a step (step 1) of increasing the molecular weight of aliphatic polycarbonate diol by a reaction of an aliphatic polycarbonate diol and a chain extender prior to a step (step 2) of reacting aliphatic polycarbonate diol and an aromatic polyester in the molten state which has been previously known, a polyester-polycarbonate type thermoplastic polyester elastomer of high quality having the following properties can be economically and stably produced by a simple method of increasing the molecular weight of aliphatic polycarbonate to be supplied to a blocking reaction. In addition, in the process, the step 1 and the step 2 are preferably performed in separate reaction tanks, and the process has an advantage that the elastomer can be produced utilizing a general-use polyester production apparatus using a system in which a transesterification or esterification reaction and a polycondensation reaction are preformed in separate reaction tanks.

In addition, the polyester-polycarbonate type thermoplastic polyester elastomer of the present invention obtained by the process has improved blocking property and blocking retainability while characteristic of the polyester-polycarbonate type thermoplastic polyester elastomer being good in heat resistance, and excellent in heat aging resistance, water resistance and low temperature property are maintained. Due to high blocking property, reduction in heat resistance resulting from reduction in the melting point is suppressed, and a mechanical nature such as a hardness, a tensile strength, and a modulus is improved. In addition, since due to improvement in blocking property retainability, fluctuation in blocking property is suppressed at molding processing, uniformity of quality of molded articles can be enhanced. In addition, the properties can enhance recycle property, leading to reduction in environmental load and the cost. Therefore, since the polyester-polycarbonate type thermoplastic polyester elastomer of the present invention has the aforementioned excellent properties and advantages like this, it can be used in various molding materials including fibers, films, and sheets. In addition, it is also suitable in elastic yarns, and molding materials such as boots, gears, tubes, and packings and, for example, is useful in utility of automobiles and household appliances requiring heat aging resistance, water resistance and low temperature property, specifically, utility such as joint boots, and electric wire covering materials. Particularly, the elastomer is suitably used as materials for parts requiring high heat resistance such as joint boots used at a periphery of automobile engines and electric covering materials. Therefore, the present invention greatly contributes to the industrial area.

The invention claimed is:

1. A process for producing a polyester-polycarbonate type thermoplastic polyester elastomer in which a hard segment consisting of a polyester constructed of aromatic dicarboxylic acid, and an aliphatic or alicyclic diol, and a soft segment consisting mainly of aliphatic polycarbonate are connected, comprising at least the following steps:
    Step 1: a step of obtaining the aliphatic polycarbonate with the increased molecular weight by a reaction of aliphatic polycarbonate diol and a chain extender,
    Step 2: a step of reacting the aliphatic polycarbonate and the polyester in the molten state, wherein the number average molecular weight of the aliphatic polycarbonate is 7000 to 70000.

2. The process for producing the polyester-polycarbonate type thermoplastic polyester elastomer according to claim 1, wherein the step 1 and the step 2 are performed in different reaction tanks.

3. A polyester-polycarbonate type thermoplastic polyester elastomer obtained by the process as defined in any one of claim 1 or 2, characterized in that when a cycle of raising the temperature of a polyester-polycarbonate type thermoplastic polyester elastomer from room temperature to 300° C. at the temperature raising rate of 20° C./min using a differential scanning calorimeter, retaining the temperature at 300° C. for 3 minutes, and lowering the temperature to room temperature at the temperature lowering rate of 100° C./min is repeated three times, the melting point difference (Tm1-Tm3) between the melting point (Tm1) obtained by first measurement and the melting point (Tm3) obtained by third measurement is 0 to 50° C.

4. The polyester-polycarbonate type thermoplastic polyester elastomer according to claim 3, wherein the hard segment consists of a polybutylene terephthalate unit, and the melting point of the resulting polyester-polycarbonate type thermoplastic polyester elastomer is 200 to 225° C.

5. The polyester-polycarbonate type thermoplastic polyester elastomer according to claim 3, wherein the hard segment consists of a polybutylene naphthalene unit, and the melting point of the resulting polyester-polycarbonate type thermoplastic polyester elastomer is 215 to 240° C.

6. The polyester-polycarbonate type thermoplastic polyester elastomer according to claim 3, wherein letting the average chain length of the hard segment to be x, and letting the average chain length of the soft segment to be y, calculated using nuclear magnetic resonance (NMR method), the average chain length (x) of the hard segment is 5 to 20, and blocking property B calculated by the following equation (1) is 0.11 to 0.45, $$B = 1/x + 1/y \qquad (1).$$

7. The polyester-polycarbonate type thermoplastic polyester elastomer according to claim 6, wherein the hard segment consists of a polybutylene terephthalate unit, and the melting point of the resulting polyester-polycarbonate type thermoplastic polyester elastomer is 200 to 225° C.

8. The polyester-polycarbonate type thermoplastic polyester elastomer according to claim 6, wherein the hard segment consists of a polybutylene naphthalene unit, and the melting point of the resulting polyester-polycarbonate type thermoplastic polyester elastomer is 215 to 240° C.

* * * * *